United States Patent
Pelka et al.

(10) Patent No.: US 9,690,041 B2
(45) Date of Patent: Jun. 27, 2017

(54) AIR CAVITY LED BACKLIGHT UNIT

(71) Applicant: Seoul Semiconductor Co., Ltd., Ansan-si (KR)

(72) Inventors: David G Pelka, Los Angeles, CA (US); Simon Magarill, Cincinnati, OH (US)

(73) Assignee: Seoul Semiconductor Co., Ltd., Ansan-si (KR)

( * ) Notice: Subject to any disclaimer, the term of this patent is extended or adjusted under 35 U.S.C. 154(b) by 11 days.

(21) Appl. No.: 14/571,961

(22) Filed: Dec. 16, 2014

(65) Prior Publication Data
US 2015/0168641 A1 Jun. 18, 2015

Related U.S. Application Data

(60) Provisional application No. 61/976,339, filed on Apr. 7, 2014, provisional application No. 61/916,923, filed on Dec. 17, 2013.

(51) Int. Cl.
| | |
|---|---|
| *F21V 7/04* | (2006.01) |
| *F21V 3/00* | (2015.01) |
| *F21V 5/00* | (2015.01) |
| *F21V 8/00* | (2006.01) |

(52) U.S. Cl.
CPC .......... *G02B 6/0096* (2013.01); *G02B 6/0055* (2013.01)

(58) Field of Classification Search
CPC ........ F21V 7/0008; F21V 5/04; F21V 7/0025; F21V 7/0058; F21V 7/06–7/09; G02F 1/133615; G02F 1/133605; G02F 1/133604; G02F 1/133603; G02B 6/0096; G02B 6/0055; G02B 19/0028; G02B 6/0038; G02B 6/0016; H01L 33/58

USPC ........ 362/97.1–97.4, 311.02, 311.06, 311.09, 362/311.1
See application file for complete search history.

(56) References Cited

U.S. PATENT DOCUMENTS

| | | | |
|---|---|---|---|
| 4,043,636 A | 8/1977 | Eberhardt et al. | |
| 6,007,209 A | 12/1999 | Pelka | |
| 7,293,899 B2 * | 11/2007 | Boyd | G02B 6/0031 362/19 |

(Continued)

FOREIGN PATENT DOCUMENTS

WO 2006-137686 12/2006

OTHER PUBLICATIONS

International Search Report issued on Mar. 13, 2015, in International Patent Application No. PCT/KR2014/012461.

(Continued)

*Primary Examiner* — Renee Chavez
*Assistant Examiner* — Erin Kryukova
(74) *Attorney, Agent, or Firm* — H.C. Park & Associates, PLC (57) ABSTRACT

A light-emitting diode (LED) backlight unit includes first and second curved bottom floor reflectors exhibiting mirror image symmetry along a center line extending in a latitudinal direction, first and second sides disposed along a longitudinal direction, the first and second bottom floor reflectors disposed therebetween, first and second back reflectors disposed on distal ends of the first and second bottom floor reflectors, respectively, away from the center line, and LEDs disposed in or adjacent to the first and second back reflectors. A curvature of the first and second bottom floor reflectors respectively reach a maximum near the center line.

7 Claims, 9 Drawing Sheets

(56) References Cited

U.S. PATENT DOCUMENTS

| | | | |
|---|---|---|---|
| 2002/0051103 A1* | 5/2002 | Faris | G02B 6/0055 349/65 |
| 2005/0185394 A1* | 8/2005 | Sakamoto | G02B 6/0026 362/133 |
| 2006/0203512 A1* | 9/2006 | Ko | G02F 1/133605 362/609 |
| 2007/0047262 A1* | 3/2007 | Schardt | G02B 6/0096 362/623 |
| 2007/0109791 A1* | 5/2007 | Chinniah | F21S 48/1233 362/334 |
| 2007/0147036 A1* | 6/2007 | Sakai | G02B 6/0096 362/240 |
| 2008/0186431 A1* | 8/2008 | Imojo | G02F 1/133605 349/65 |
| 2010/0073938 A1* | 3/2010 | Ho | F21V 5/04 362/335 |
| 2010/0271843 A1* | 10/2010 | Holten | F21V 7/0008 362/609 |
| 2011/0096529 A1 | 4/2011 | Wheatley et al. | |
| 2011/0096544 A1* | 4/2011 | Nakamura | F21V 7/0008 362/235 |
| 2011/0134659 A1 | 6/2011 | Aastuen et al. | |
| 2011/0211335 A1 | 9/2011 | Ko | |
| 2011/0222267 A1* | 9/2011 | Park | G02F 1/133615 362/97.1 |
| 2012/0250293 A1 | 10/2012 | Jeong et al. | |
| 2013/0301240 A1* | 11/2013 | Liu | F21V 13/04 362/97.1 |

OTHER PUBLICATIONS

R. Tsuchiya et al. "Thin side-lit, hollow-cavity flat LED lighting panel for ultra-uniform LCD backlight applications" Society of Information Display (SID) 08 Intl. Sym. Digest Tech Papers, (2008), pp. 874-877.

* cited by examiner

AIR CAVITY LED BACKLIGHT UNIT

CROSS-REFERENCE TO RELATED APPLICATIONS

This application claims priority from and the benefit of U.S. Provisional Application No. 61/916,923, filed on Dec. 17, 2013, and U.S. Provisional Application No. 61/976,339, filed on Apr. 7, 2014, which are hereby incorporated by reference for all purposes as if fully set forth herein.

BACKGROUND

Field

Exemplary embodiments of the present invention relate to a low-profile, thin side-lit, hollow cavity, LED backlight apparatus for LCD TVs, tablets, notebooks computers, and the like.

Discussion of the Background

Light emitting diodes (LEDs) have now become the preferred light sources for the backlight units (BLUs) of liquid crystal display (LCD) panels. As a consequence of their dramatic increase in efficacy, the number of LEDs required to adequately illuminate BLUs has decreased by a factor of 3-4 recently. Also consumer demand for thinner LCD panels in devices such as TVs mean that there may be a need for new optical architectures to allow for the manufacture of these thinner designs and yet still maintain adequate illuminance and display uniformity to the LCD panels.

Existing optics for direct-view BLUs consists of small refractive lenses placed directly over LED light sources, arranged in geometrical arrays, and acting as baffles to redirect the intense light coming from the LEDs, such that hot spots in the LCD panel may be eliminated or reduced to acceptable levels, with the result that the thickness of the resulting BLU may typically be 20-25 mm. For example, these thicker BLUs are disclosed in U.S. Patent Publication No. 2006/0203512A1, U.S. Pat. No. 7,293,899B2, and R. Tsuchiya et al. "Thin side-lit, hollow- cavity flat LED lighting panel for ultra-uniform LCD backlight applications" SID 08 Intl. Sym. Digest Tech Papers, 874-877 (2008).

A typical flat-panel display may utilize an LCD as a means of displaying information. LCDs, which allow the display of alphanumeric graphic or other information, comprise a medium whose transmittance changes in response to the application of electrical potential across the medium. LCDs may be viewed even in an otherwise dark environment by applying illumination uniformly to their rear face. An exemplary backlighting apparatus for an LCD is disclosed in U.S. Pat. No. 4,043,636.

Notebook computers and tablets having flat-panel displays may be used during travel and in areas with little light such as trains and airplanes. Hence, the LCDs included therein may have an acceptable level of brightness and uniformity so that the user can easily read the information on the display. Furthermore, software applications that are used in notebook computers, tablets, and LCD TVs usually require color images. Hence the display may have spectral content that is compatible with the colors displayed on the LCD. The light source may be compact so that it will not significantly increase the size and weight of the notebook computer, tablet, or LCD TV. Many LCD TVs are currently made in a 16×9 format, and the thinness of the display may be a critical factor to its purchase by an end-user. Most LCD TV backlight units may have a total thickness of 25 mm or less, and most recently, less than 13 mm thick.

Ultra-thin backlight units may be constructed using a 3-4 mm thick acrylic sheet, with the LEDs being placed along one edge of the sheet, to couple the light from the LEDs into a plastic waveguide and conduct the light throughout the sheet using total internal reflection (TIR). The light may be ejected using an out-coupling array of micro-dots or micro-lenses that disrupt the TIR light conduction and allow the light to be ejected uniformly over the back surface of the LCD display. However, the large acrylic sheets may be expensive and weigh too much. Thus, to make the backlight units less costly and lighter in weight, manufacturers have turned to so-called "direct view" backlights. Here, the large acrylic sheet is replaced by an array of small, light, and inexpensive lenses that baffle and spread the light emitted from the LEDs out over the surface of the backlight unit, such that it has sufficient illuminance and uniformity. However, as the thickness of the backlight unit decreases from 25 mm down to the 11-12 mm range, the refractive optical principles upon which these lenses are based may cease to yield acceptable uniformity.

U.S. Pat. No. 6,007,209 discloses baffling light emitted directly from LEDs to an LCD panel, such that the LEDs may be arranged into a planar array and then used as a direct-view BLU for an LCD display. However, at the time this patent issued, LEDs were not very efficient or powerful, but subsequently white LEDs have gone from an efficacy of about 5 lumens/Watt to more than 200 lumens/Watt. Thus, the baffling technology disclosed in U.S. Pat. No. 6,007,209 may provide a BLU with insufficient uniformity and illuminance value.

SUMMARY

Exemplary embodiments of the present invention provide a very low profile, side-lit, hollow cavity, LED backlight assembly for use in a transmissive display system.

Additional features of the inventive concept will be set forth in the description which follows, and in part will be apparent from the description, or may be learned by practice of the inventive concept.

An exemplary embodiment of the present invention discloses a transmissive display such as a liquid crystal display (LCD) that is illuminated by a backlight assembly. The backlight assembly includes an array of LEDs, that has its light transported via a reflective baffle such that it illuminates a hollow-cavity light chamber. The transmissive display is positioned adjacent the light chamber so that the light exiting the light chamber and passing through an optical conditioning stack of filters then illuminates the transmissive display. The backlight assembly includes a bottom floor specular reflector or a combination of a specular and diffuse bottom floor reflectors and an array of baffled localized optical lenses positioned over each LED source to ensure that the light leaving the optical cavity through the optical conditioning film stack will achieve sufficient spatial uniformity and illuminace so that the LCD can accurately display the images from its various pixel elements.

An exemplary embodiment of the present invention also discloses a 10 mm or less thick LED backlight unit (BLU) that has low profile and is side lit from two sides and that uses symmetrical specular bottom-reflectors having a reflectivity of 98+% to transport the light from LEDs to the back of a transmissive LCD display. Local optical lenses or reflectors may be placed over the LEDs to achieve the spatial uniformity of light at the transmissive LCD display in lateral and longitudinal directions.

An exemplary embodiment of the present invention also discloses a low-profile 10 mm or less thick LED BLU that uses a specular and diffuse bottom reflector having a reflectivity of 98+% in combination, which inject light from two sides of the BLU into a hollow air-cavity, together with local optical elements placed over the LEDs to achieve excellent spatial uniformity and illuminance at the transmissive LCD display.

An exemplary embodiment of the present invention also discloses a low profile LED BLU that injects light from an array of LEDs from a single non-symmetrical side of the BLU and uses a specular and diffuse bottom reflector having a reflectivity of 98+% in combination to transport the light to the transmissive LCD display, and uses local optical elements to achieve excellent spatial uniformity at the LCD display in both the longitudinal as well as the lateral directions.

It is to be understood that both the foregoing general description and the following detailed description are exemplary and explanatory and are intended to provide further explanation of the inventive concept as claimed.

BRIEF DESCRIPTIONS OF THE DRAWINGS

The accompanying drawings, which are included to provide a further understanding of the inventive concept and are incorporated in and constitute a part of this specification, illustrate exemplary embodiments of the inventive concept, and together with the description serve to explain the principles of the present invention.

DETAILED DESCRIPTION OF THE ILLUSTRATED EMBODIMENTS

The inventive concept is described more fully hereinafter with reference to the accompanying drawings, in which exemplary embodiments of the inventive concept are shown. The inventive concept may, however, be embodied in many different forms and should not be construed as limited to the exemplary embodiments set forth herein. Rather, these exemplary embodiments are provided so that this disclosure is thorough, and will fully convey the scope of the inventive concept to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
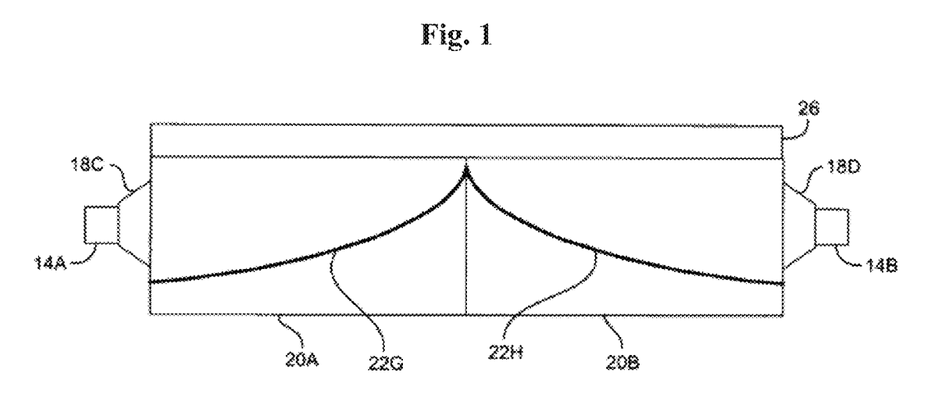
FIG. 1 is a cross-sectional view of a backlight unit that utilizes two light chambers according to the related art.

FIG. 1 is a cross-sectional side view of a backlight assembly that utilize two light chambers according to the related art, such as is disclosed in U.S. Pat. No. 7,293,899. Light sources 14A and 14B may emit light that passes through first conditioners 18C and 18D and into light chambers 20A and 20B, respectively. The light then reflects off of reflectors 22G and 22H before illuminating second conditioner 26. A transmissive display (not shown) may be positioned adjacent to the second conditioner 26, to be illuminated. The second conditioner 26 may further include a top diffuser film, i.e., an additional diffuser film comprising the outermost layer of the second conditioner 26, to achieve uniform illumination along the joining line of the light chambers 20A and 20B.

Figure 2:
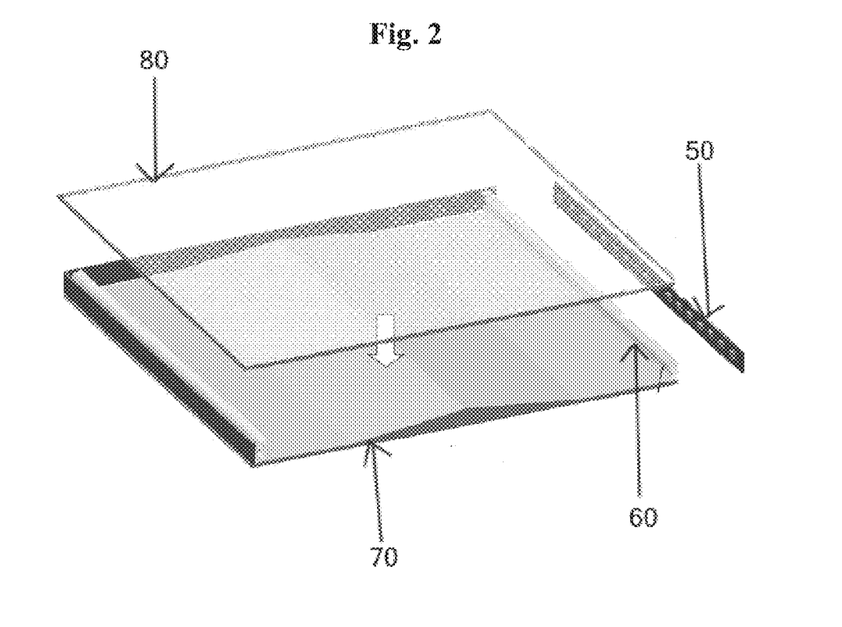
FIG. 2 is a schematic drawing of a side-lit, hollow-cavity LED backlight unit according to the related art.

FIG. 2 is a perspective view of a thin side-lit, hollow-cavity LED backlight unit according to the related art, such as taught in R. Tsuchiya et al, Society of Information Display (SID) Digest 2008, pp. 874-877. An array of LED light sources 50, emit light which is collimated by collimator optics 60 and reflects off of a uniquely shaped bottom reflector 70, so as to create a uniform illuminance pattern on the top diffuser 80. FIG. 2 shows a two chambered backlight assembly with perfect mirror symmetry about the center line of the backlight module.

Figure 3:
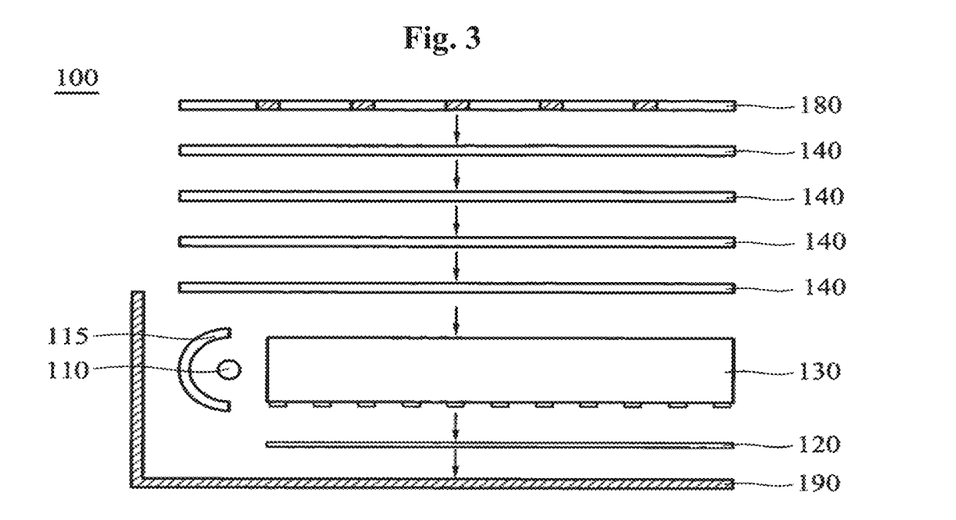
FIG. 3 is a disassembled side view of a conventional edge backlight module according to the related art.

FIG. 3 is an exploded view showing an LCD 100 with a conventional edge backlight module, according to the related art. In FIG. 3, the LCD 100 comprises a liquid crystal panel 180, a frame 190, and a conventional edge backlight module disposed in the frame 190. The conventional edge backlight module comprises a lamp as the light source 110, a reflective plate 120, and a light guide plate 130. Optical films 140, such as protective diffusion plates, prism films, brightness enhancement films, and inner effusion plates, may be used in the backlight module. Further, a light source reflector 115 may be disposed at the outside lights source 110 to prevent light from scattering outward from the backlight module. The light guide plate 130 in the optical films 140 can be alternatively disposed or removed depending on the particular requirement.

In FIG. 3, the light source 110 emits light toward the light guide plate 130. The light guide plate 130 guides the light toward the upper side of the backlight module, i.e., toward the liquid crystal display panel 180, so as to enhance the brightness of the LCD 100 and brightness distribution on the liquid crystal panel 180. The reflective plate 120 reflects the light scattered back to the light guide plate 130 to enhance light usage. Alternatively, and the backlight module without the light guide plate 130 the light source 110 emits light toward the reflective plate 120 directly and the reflective plate 120 reflects the light toward the liquid crystal panel 180.

Brightness distribution of an edge backlight module may be determined by the microstructure and size of the light guide plate. In a conventional edge backlight module, however, the light guide plate may adversely reduce the light usage and cause a significant weight increase for the backlight module, when the size of the backlight module is large. In this case, it may be difficult to modulate the reflective plate 120 made of a single material according to the microstructure and size thereof. Thus, deterioration of the brightness distribution may occur.

Figure 4:
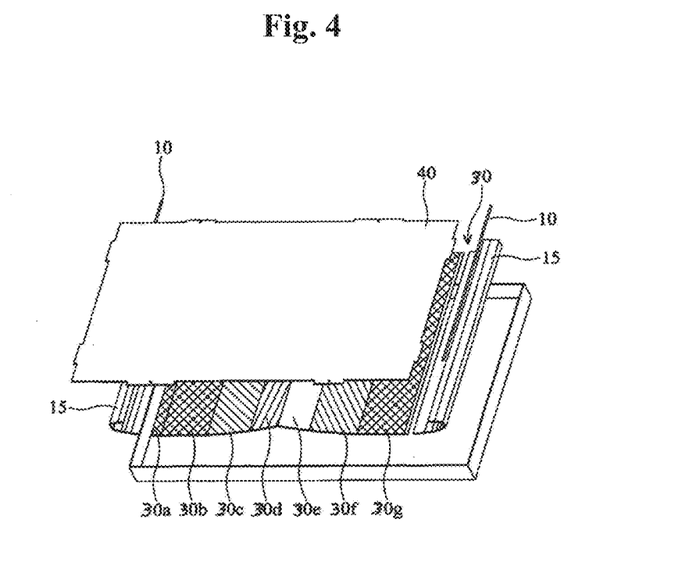
FIG. 4 is a perspective view of an LED backlight module having both specular and diffuse bottom reflectors according to the related art.

FIG. 4 is a perspective view of an LED backlight module according to the related art, which may include light sources 10 disposed at both sides of a reflective plate 30 optical films 40, and a light source reflector 15. The reflective plate 30 includes reflective regions 30a, 30b, 30c, 30d, 30e, 30f, and 30g. Light emitted from the light sources 10 may be reflected by the reflective plate 30 toward the direction of the optical films 40. Among the reflective regions 30a, 30b, 30c, 30d, 30e, 30f, and 30g, the middle reflective region 30d may be disposed furthest away from the light sources 10, and the reflective regions 30a and 30g are closest to the light sources 10.

The reflective regions that are farthest away from the light sources 10 may have the largest light diffusivity, while the reflective regions closest to the light sources 10 may have the smallest light diffusivity. Reflective regions 30a, 30b, 30c, 30d, 30e, 30f, and 30g, may be set to have different diffusivities in order to enhance the brightness distribution of the reflective plate 30. The diffusivity of the reflective region 30d, which is farthest away from the light sources 10, may be the largest; that is, the surface of the reflective region 30d may be a diffusing surface. The diffusivities of the reflective regions 30a and 30g, which are near the light sources 10 may be the smallest. That is, surfaces of the reflective regions 30a and 30g may be reflective. Diffusivities of the reflective regions between 30a, 30d, and 30g may be modulated according to the position in which the diffusivities of the reflective regions away from the light sources 10 are larger than the diffusivities of the reflective regions nearer the light sources 10.

The surfaces of the reflective regions 30a, 30b, 30c, 30d, 30e, 30f, and 30g may be made of different materials. Alternatively, diffusion particles with different surface diffusivities may be employed on the surfaces of the reflective regions to differentiate the diffusivities thereof. For example, surface densities of the diffusion particles of the reflective regions away from the light source can be higher than the surface densities of the diffusion particles of the reflective regions near the light source. Further, the reflective regions on the reflective plate 30 can be determined according to the arrangement of the light source 10.

Figure 5:
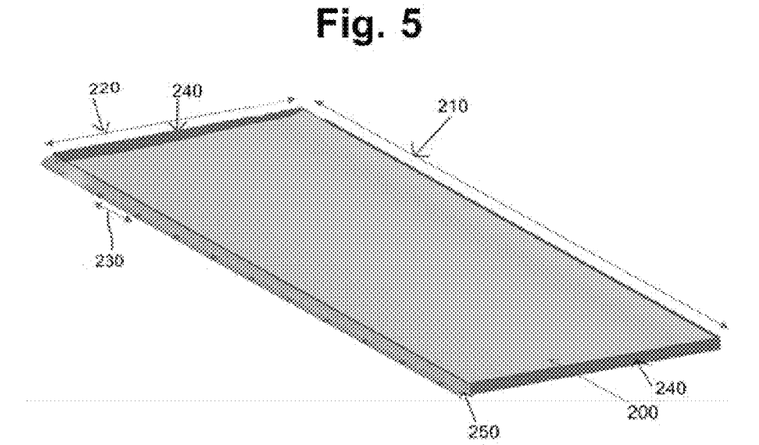
FIG. 5 is a perspective view of a single chamber of a two-chambered LED backlight unit architecture according to an exemplary embodiment of the present invention.

FIG. 5 shows a perspective view of a single chamber of a two-chambered LED backlight unit architecture according to an exemplary embodiment of the present invention. The single chamber of the LED backlight unit has a longitudinal direction 220, and exhibits mirror image symmetry about a center line along a lateral direction 210. Thus, a second chamber (not shown) is disposed on the other side of the center line According to an experimental example applying the present exemplary embodiment, a 32 inch LCD TV display has a lateral dimension of 700 mm in length and 400 mm in width. Thus, each chamber of the LED backlight unit is 200 mm in width.

The LED backlight unit according to the present exemplary embodiment includes a curved bottom floor specular reflector 200, which may be a polymer reflector film, such as 3M™ enhanced specular reflector (ESR) film, having reflectivity of 98+% for all angles of incidence, with the curvature reaching a maximum at the end of the specular reflector towards the longitudinal direction. The ESR film may also be assumed along two passive sides 240.

A back reflector 250 is disposed on a distal end of the LED backlight unit opposite the center line, along the longitudinal direction 220, and a hollow cavity structure is formed on the curved bottom floor specular reflector 200 between the center line, passive sides 240, and back reflector 250. LEDs 290 may be disposed in or adjacent to the back reflector 250, and lenses 280 may be disposed over LEDs, which will be described in detail below. Optical films 260 and 270 may be disposed on top of the hollow cavity structure.

LED spacing 230 is optimally in the range of 64 mm to 54 mm (that is, 11 to 13 LEDs along the lateral direction 210) for a single chamber of the LED backlight unit having a length of 700 mm along the lateral direction 210 and a width of 200 mm along the longitudinal direction 220, according to the experimental example applying the present exemplary embodiment. With approximately 120 lumens assumed per LED 290, a radiance of 9000 nits may be produced. Assuming a 6% transmission for the LCD panel, about 500 nits of delivered maximum screen brightness may be achieved.

FIG. 6 shows very small lenses 280 disposed over each of the LEDs 290 in order to obtain good spatial uniformity of light in the lateral direction 210. These free-form lenses 280 act as a baffle for the light emitted from the LEDs 290. When the LEDs 290 are not baffled, light emitted therefrom may be in a hemispherical pattern, and with the lenses 280 in place may be transformed to a highly asymmetric light pattern, resulting in good uniformity in the lateral direction 210.

Figure 6A:
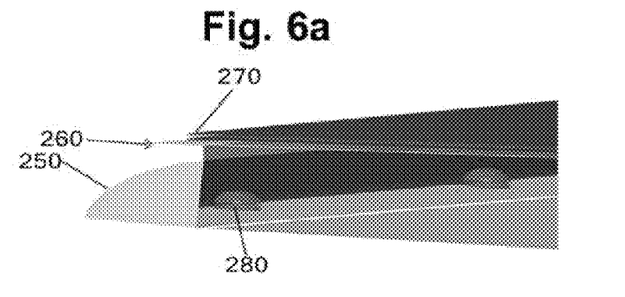
FIGS. 6a, 6b, 6c, 6d, and 6e show different views and characteristics of a lens of the LED backlight unit of FIG. 5.

First, FIG. 6a shows the back reflector 250 and lenses 280 situated nearby. A film stack may be disposed on the hollow cavity, including a diffuser film 260 and a brightness enhancing prism film 270. The film stack may also include a polarization reflection film (not shown).

Figure 6B:
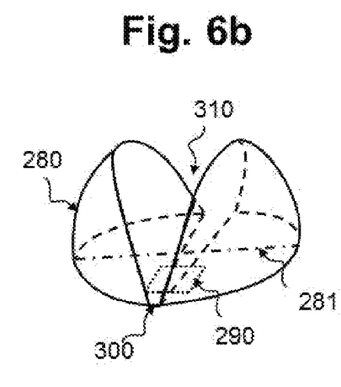
Figure 6C:
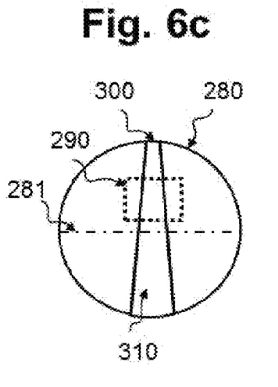

FIG. 6b shows a perspective view of a lens 280 having two major side lobes ("double-lobed"), as well as an LED 290 disposed at the bottom of the lens 280. FIG. 6c shows a top view of the same lens 280, in which the angle of a V-shaped groove 310 is about 10.5°, and the small opening 300 of the groove may be about 0.2 mm in width. According to one experimental example, the specific lens for a 32 inch TV display (700 mm in the lateral direction and 400 mm in the longitudinal direction) had a height of approximately 1.6 mm and a diameter of 4 mm, with the LED 290 placed just behind the horizontal bisector 281 of the lens 280 toward the small opening 300 of the V-shaped groove 310 as shown in FIGS. 6b and 6c. In other words, the LED 290 is offset from the horizontal bisector 281 which crosses a center point of the lens 280 between two lateral ends with the small opening 300 at one of the two lateral ends.

Figure 6D:
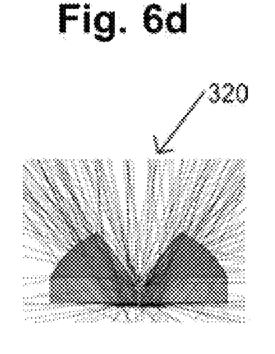
Figure 6E:
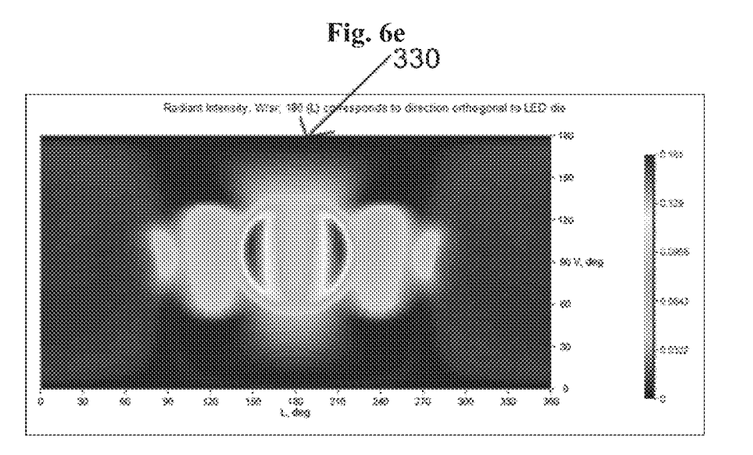
Figure 6F:
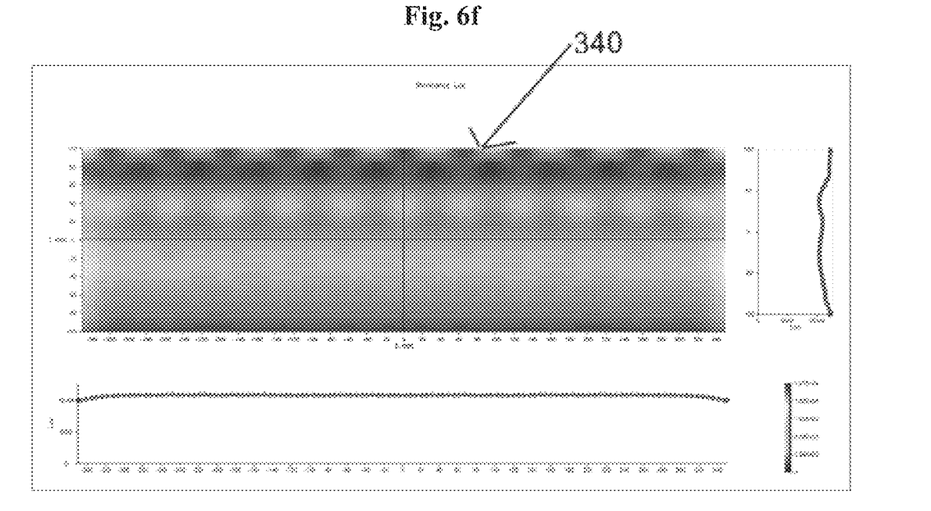
FIG. 6f is an illuminance plot showing the light uniformity in both the longitudinal and lateral directions for the LED backlight unit of FIG. 5.

FIG. 6d shows an array-traced highly asymmetric radiation pattern 320 produced as a result of light from the LED 290 passing through the double-lobed lens 280. Rather than a uniform hemispherical emission pattern from the LED 290, the radiation pattern is greatly skewed along the lateral direction 210. FIG. 6e shows a false color diagram 330 showing strong deflection of light in the lateral direction 210, from light passing from the LED 290 passing through the double-lobed lens 280. FIG. 6f shows the resulting flux uniformity 340 at the top of the film stack according to the present exemplary embodiment (where uniformity is defined as min/max lux values over the viewing aperture×100). That is, when lenses 280 as described above are respectively disposed on the LEDs 290, there is improved flux uniformity in the LED backlight unit.

An exemplary embodiment of the present invention will be described below with respect to FIG. 7. Since a process for manufacturing an LED backlight unit for an LCD TV displays may be extremely cost sensitive, and the 3M™ enhanced specular reflecting (ESR) film may be relatively expensive, an LED backlight unit may be required that uses a minimum amount of ESR film and instead incorporates a white diffuse reflecting film (98+% reflectivity), which may be lower cost. Thus, the present exemplary embodiment relates to a hybrid low-profile, side-lit, hollow cavity LED backlight unit.

Figure 7:
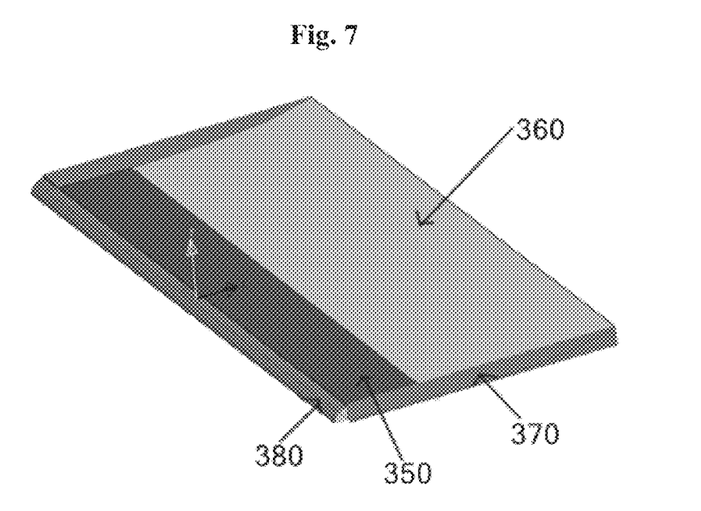
FIG. 7 is a perspective view of a single chamber of a two-chambered LED backlight unit according to an exemplary embodiment of the present invention.

FIG. 7 shows one-half of a symmetrical double-chambered hybrid low-profile, side-lit, hollow cavity LED backlight unit. the LED backlight unit according to the present exemplary embodiment has a curved bottom 360 similar to the LED backlight unit described above. Side reflectors 370 may be made with an ESR film. A bottom section 350 may be about 65 mm in width and 700 mm in length and be made of ESR film, and the rest of the bottom reflector 360 may use the white diffusive (reflectivity 98+%) material and be about 135 mm in width. The back reflector 380 includes a reflector to direct the light emitted from LEDs, and also includes baffled micro-lenses positioned over each of the LED sources (not shown). The micro-lenses according to the present exemplary embodiment may be similar to those described above.

Figure 8:
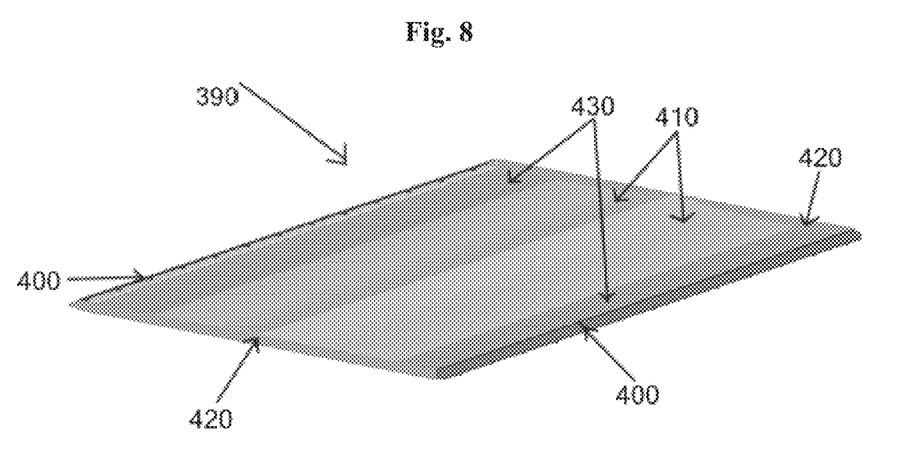
FIG. 8 is a perspective view of the complete two-chambered LED backlight unit according to the exemplary embodiment of FIG. 7.

FIG. 8 shows a perspective view 390 of a complete double-cavity LED backlight according to an exemplary embodiment of the present invention, having both symmetrical curved bottom reflectors including both the ESR film strips 430 as well as the diffuse reflectors 410. In addition, side reflectors 420 made of ESR film are shown as well as reflector/light injectors 400 containing micro lenses positioned over each LED. The lenses may help obtain good spatial uniformity of light in the lateral direction through the optical film stack on top of the hollow cavity (not shown). The optical film stack may be similar to the film stack described above.

Figure 9:
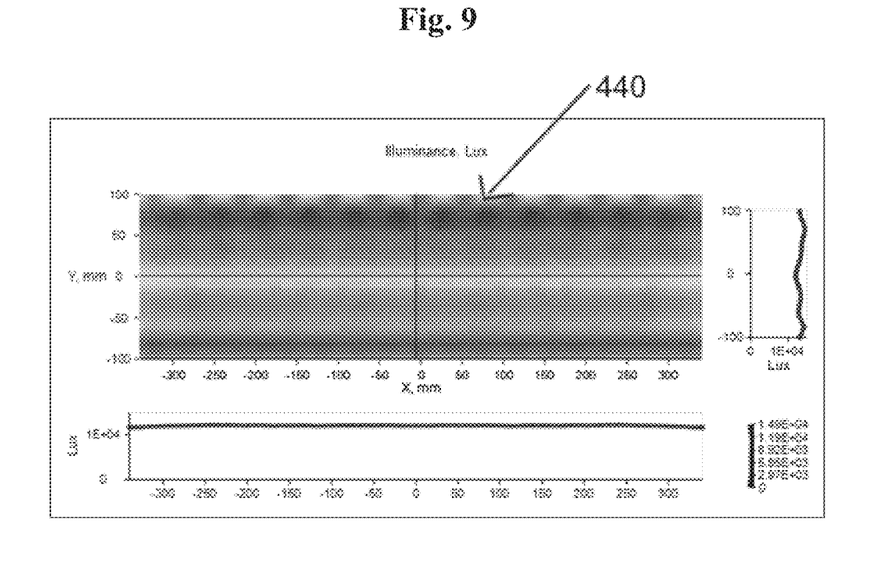
FIG. 9 is an illuminance plot showing the light uniformity of the LED backlight unit of FIG. 7.

FIG. 9 shows the resulting flux uniformity 440 along both the longitudinal (y) direction as well as the lateral (x) direction with average uniformity of about 85%, optical efficiency of about 60% with maximum screen brightness of about 500 nits, assuming LED sources emitting about 120 lumens per LED.

In addition achieving lower manufacturing cost in terms of construction materials, as described above with respect to the exemplary embodiment described above, there may be an issue with respect to ease of manufacturing the LED backlight unit. A single cavity with side-lit light injection from just one side may be easier to manufacture than a double-chambered (cavity) with light injection from two sides. Thus, an exemplary embodiment of the present invention addressed the design of a single hollow cavity with light injection from just one side.

In an LED backlight unit having a single cavity according to the present exemplary embodiment, light must transverse the full longitudinal direction (for example, 400 mm) rather than half of the longitudinal direction, as well as provide good light flux uniformity and sufficient brightness at the back of a transmissive LCD display. Although an ESR film may be deposited over the entire bottom reflector surface to obtain an adequate solution according to one experimental example, the minimum depth of the cavity grew to 14 mm from 10 mm (established with respect to the two-chambered LED backlight unit described above), and also may be too expensive for OEM manufacturers to implement. Consequently, the present exemplary embodiment describes a hybrid approach in which a combination of a smaller amount of ESR film together with much less expensive white highly reflecting diffuse film for the bottom floor reflector. For both the present exemplary embodiment as well as the experimental example, the back reflector as well as the lenses disposed on the individual LED sources may be similar to those with respect to the exemplary embodiments described above.

Figure 10:
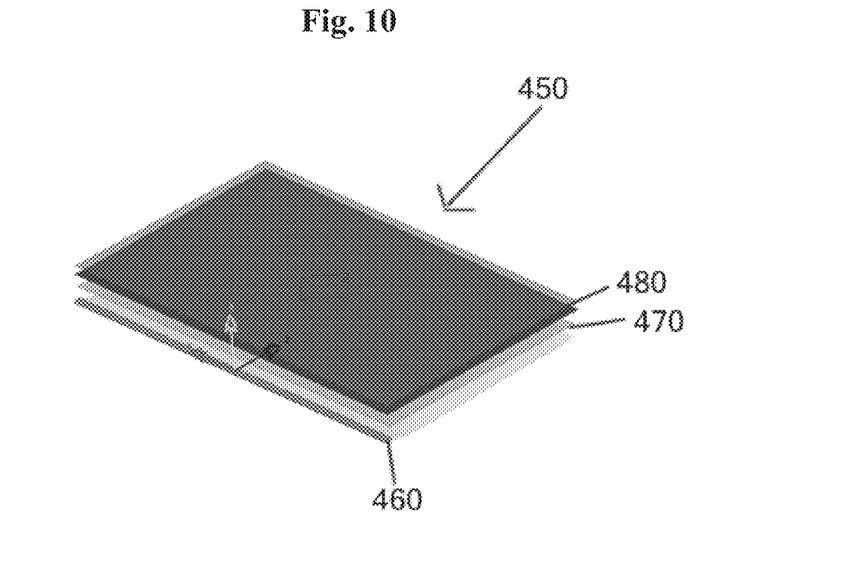
FIG. 10 is a perspective view of an LED backlight unit according to an exemplary embodiment of the present invention.

FIG. 10 shows the single hollow cavity, low-profile, side-lit, LED backlight unit 450 according to the present exemplary embodiment, except for three straight ESR side reflectors, which are purposely omitted so the other components may more easily be delineated. The bottom optical diffuser 470 is shown along with the two crossed prism films 480. The reflector 460 includes the LEDs (not shown) as well as the lenses (not shown) that baffle the light and distort the usual hemispherical Lambertian light pattern from the LEDs into a pattern in which the light is more strongly dispersed in the lateral direction (as shown above in FIG. 6).

Figure 11:
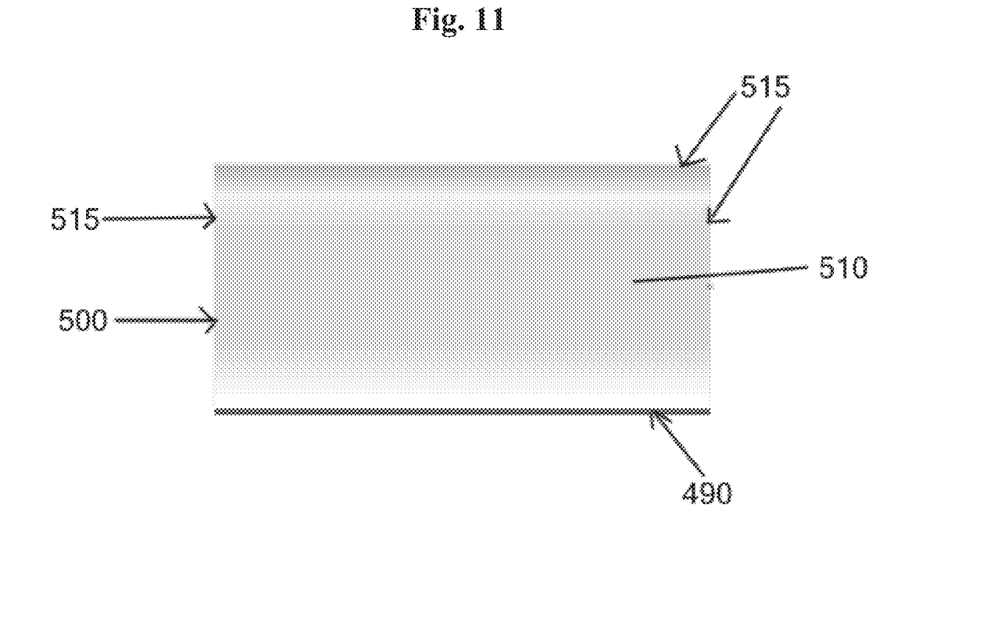
FIG. 11 shows a top view of the LED backlight unit of FIG. 10.
Figure 12:
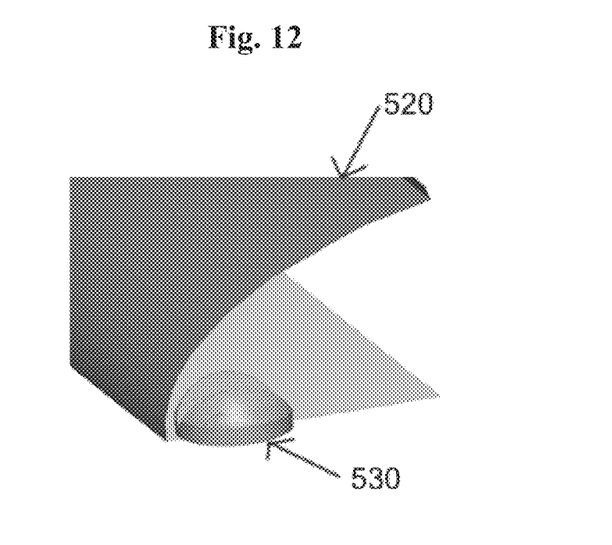
FIG. 12 shows an injection reflector and micro lens baffle of the LED backlight unit of FIG. 10.
Figure 13:
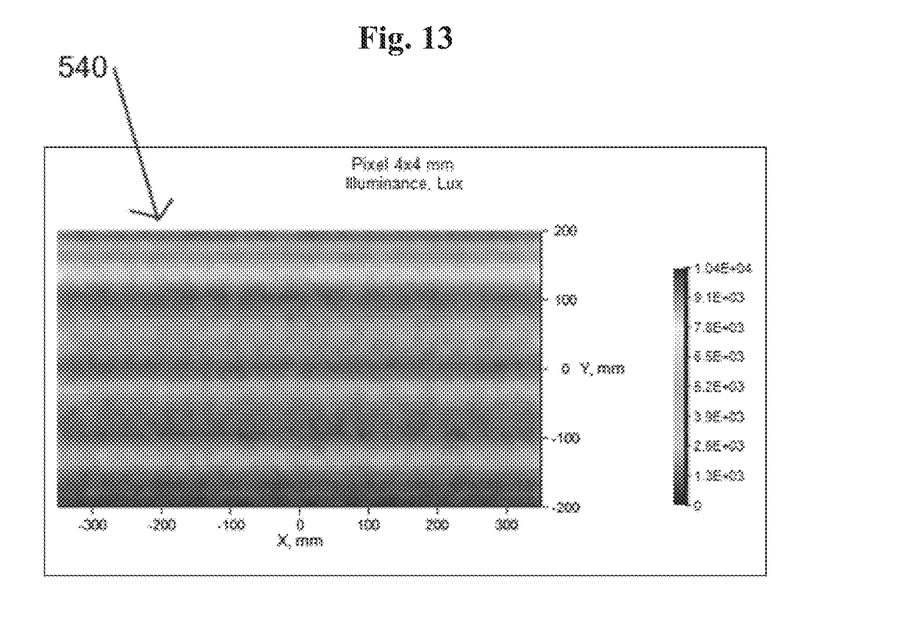
FIG. 13 is an illuminance plot showing the light uniformity of the LED backlight unit of FIG. 10.

FIG. 11 is a top down view of the LED backlight unit according to the present exemplary embodiment, with the optical film stack removed, showing the bottom curved floor reflector 510 made entirely from ESR film. Also, three flat vertical side reflectors 515 are shown as well reflector 490 (extending along the lateral (i.e., 700 mm) direction), and the longitudinal (i.e., 400 mm) direction 500. As indicated above, to achieve acceptable uniformity of light in the lateral and longitudinal directions, the depth of the cavity (not shown) increased. According to one experimental example, the depth of the cavity grew from the 10 mm of the exemplary embodiments described above to 14 mm. FIG. 12 shows a reflector 520 disposed along the entire lateral edge of the LED backlight unit and a micro-lens baffle 530, which is disposed over an LED (not shown), and is similar to the double-lobed lens described above. Finally, FIG. 13 shows an illuminance plot 540 for the experimental example of the present exemplary embodiment. Illuminance uniformity is about 85% with 35 LEDs, each LED assumed to be emitting 120 lumens, lined up along the lateral direction. The LED backlight unit has optical efficiency of about 62% and delivers about 600 nits of luminance (peak) to the back of the transmissive LCD display.

As discussed above, the 3M™ ESR film may be too costly for a competitively priced LED backlight unit, and therefore a hybrid solution that uses a combination of a curved bottom floor reflector including both ESR film and less costly white Lambertian diffusing film, where the reflectivities of these materials would be approximately 98%.

Figure 14:
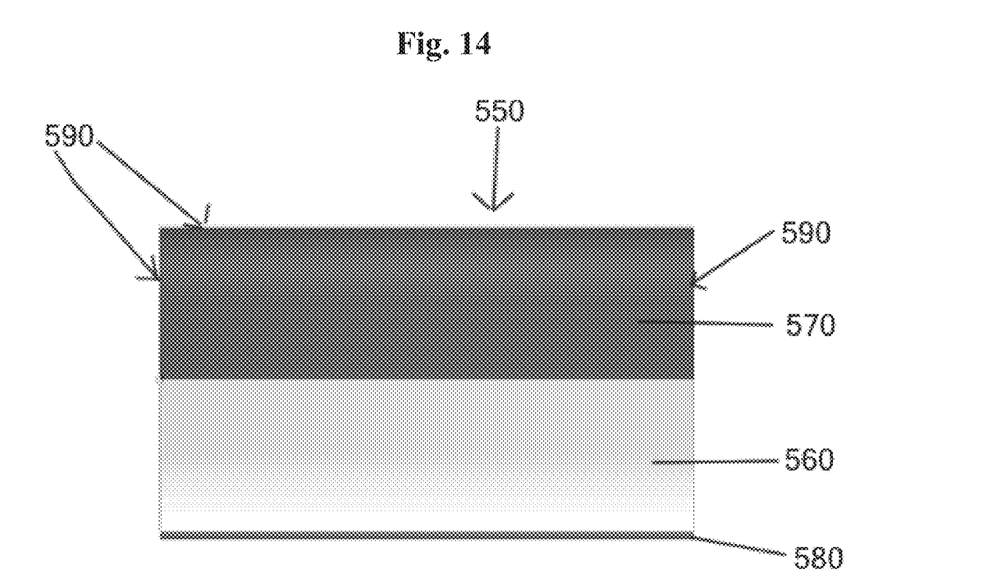
FIG. 14 shows a top view of an LED backlight unit with a top-most optical stack removed, according to an exemplary embodiment of the present invention.

FIG. 14 is a top down view of a hybrid single hollow cavity backlight unit 550 according to an exemplary embodiment of the present invention, with an optical film stack removed so that an underlying bottom floor reflector structure can be seen. There are three vertical ESR reflectors 590 on all sides save an LED light injection side 580, which contains LEDs (not shown) as well as respective micro-lens baffles (not shown). The curved bottom floor reflector is a combination of an ESR film strip 560 while the remaining portion of the curved reflector floor 570 is made from a white Lambertian diffusing film having high reflectivity (98+%). The other optical elements are substantially the same as those described above with respect to FIG. 12.

Figure 15:
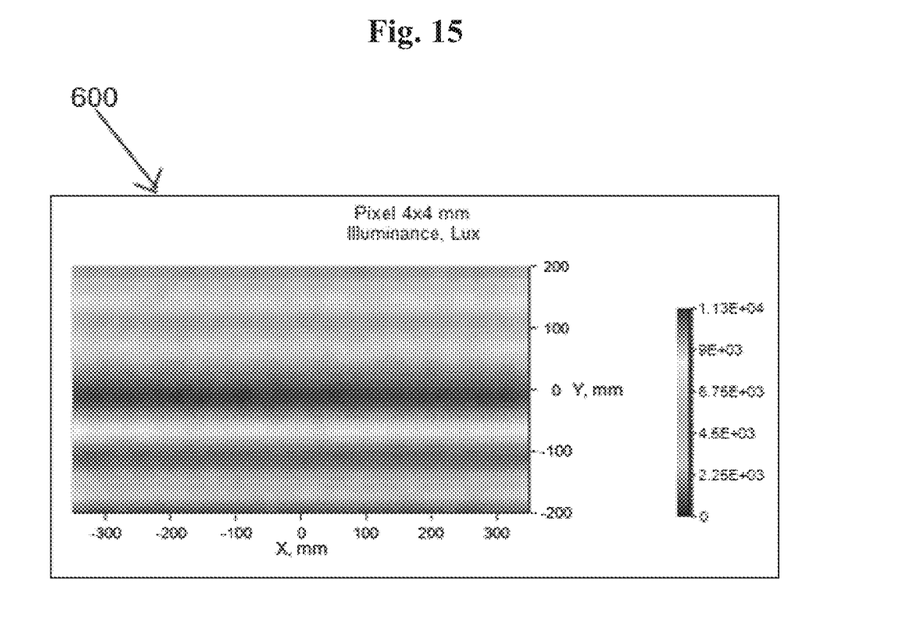
FIG. 15 is an illuminance plot showing the light uniformity of the LED backlight unit of FIG. 14.

FIG. 15 shows an illuminance map 600 that shows an overall uniformity of about 87%, an optical efficiency of 64%, and a peak delivered luminance of approximately 600 nits for an experimental example of the present exemplary embodiment having an array of 35 LEDs with a pitch of 20 mm, each LED assumed to be emitting 120 lumens of light. The required cavity depth to achieve this level of uniformity is 13.5 mm.

It will be apparent to those skilled in the art that various modifications and variations can be made in the present inventive concept without departing from the spirit or scope of the inventive concept. Thus, it is intended that the present inventive concept cover the modifications and variations of this inventive concept provided they come within the scope of the appended claims and their equivalents.

What is claimed is:

1. A light-emitting diode (LED) backlight unit, comprising:
   first and second curved bottom floor reflectors exhibiting mirror image symmetry along a center line extending in a latitudinal direction;
   first and second sides disposed along a longitudinal direction, the first and second bottom floor reflectors disposed therebetween;
   first and second back reflectors disposed on distal ends of the first and second bottom floor reflectors, respectively, away from the center line;
   LEDs disposed in or adjacent to the first and second back reflectors; and
   lenses disposed over the LEDs,
   wherein a curvature of the first and second bottom floor reflectors respectively reach a maximum near the center line,
   wherein upper surfaces of the LEDs face a top surface of the LED backlight unit, and
   wherein the lenses each have a center point, a horizontal bisector crossing the center point between a first lateral end and a second lateral end opposite the first lateral end in plan view, and an upper surface and a bottom surface in cross-sectional view,
   wherein the lenses each comprise two lobes separated by a V-shaped groove extending from the first lateral end to the second lateral end and extending from the upper surface to the bottom surface,
   wherein the V-shaped groove has a small opening at the first lateral end compared to a large opening at the second lateral end, and
   wherein the LEDs are offset from the horizontal bisector at a position closer to the small opening than the large opening.

2. The LED backlight unit of claim 1, wherein the first and second bottom floor reflectors each comprise an enhanced specular reflector having a reflectivity of 98+%.

3. The LED backlight unit of claim 1, wherein:
   the first and second bottom floor reflectors each comprise a first portion comprising an enhanced specular reflector and a second portion comprising a white diffuse reflecting film; and
   each of the enhanced specular reflectors and the white diffuse reflecting films have a reflectivity of 98+%.

4. The LED backlight unit of claim 3, wherein the first and second portions are spaced apart from each other along the longitudinal direction.

5. The LED backlight unit of claim 1, wherein:
   the angle of the V-shaped groove for each of the lenses is about 10.5°, and
   a width of the small opening is about 0.2 mm.

6. The LED backlight unit of claim 5, wherein the lenses are configured to act as a baffle for light passing therethrough and distribute it in the latitudinal direction.

7. The LED backlight unit of claim 1, further comprising a film stack disposed above the first and second bottom floor reflectors,
   wherein:
   a first cavity is formed between the first bottom floor reflector and the film stack between the first and second sides, first back reflector, and center line; and
   a second cavity is formed between the second bottom floor reflector and the film stack between the first and second sides, second back reflector, and center line.

* * * * *